(12) United States Patent
Larsson (10) Patent No.: US 6,426,005 B1
(45) Date of Patent: Jul. 30, 2002

(54) SEQUENTIAL DESCENDING BED FILTERS WITH REJECT/WASHWATER CONTAINING IMPURITIES BEING FED TO A SEPARATE UNIT FOR ELIMINATION OF IMPURITIES

(75) Inventor: Hans F. Larsson, Västerhaninge (SE)

(73) Assignee: Parkson Corporation, Ft. Lauderdale, FL (US)

( * ) Notice: Subject to any disclaimer, the term of this patent is extended or adjusted under 35 U.S.C. 154(b) by 0 days.

(21) Appl. No.: 09/551,386

(22) Filed: Apr. 18, 2000

(51) Int. Cl.⁷ .............................................. B01D 24/28
(52) U.S. Cl. ....................... 210/650; 210/702; 210/748; 210/754; 210/760; 210/764; 210/800; 210/806; 210/807; 210/786; 210/792; 210/252; 210/268
(58) Field of Search ................................ 210/786, 791, 210/792, 793, 794, 795, 798, 805, 806, 702, 268, 650, 748, 760, 754, 764, 800, 807, 252

(56) References Cited

U.S. PATENT DOCUMENTS

| | | | |
|---|---|---|---|
| 4,126,546 A | | 11/1978 | Hjelmnér et al. ........... 210/786 |
| 4,197,201 A | | 4/1980 | Hjelmnér et al. ........... 210/189 |
| 4,246,102 A | | 1/1981 | Hjelmnér et al. ........... 210/704 |
| 5,112,504 A | * | 5/1992 | Johnson ....................... 210/268 |
| 5,462,654 A | * | 10/1995 | Hering, Jr. .................. 210/268 |
| 5,543,037 A | * | 8/1996 | Hering, Jr. .................. 210/268 |
| 5,843,308 A | | 12/1998 | Suozzo et al. ........... 210/195.1 |

\* cited by examiner

Primary Examiner—Robert J. Popovics
(74) Attorney, Agent, or Firm—BakerBotts, LLP

(57) ABSTRACT

A treatment system for treating water/wastewater includes two continuously operating granular media filters that are operated together in series. The water/wastewater to be treated is introduced as an influent into the first of the granular media filters and is treated therein. Treated, processed water/wastewater or effluent is produced as is a first reject which contains impurities separated from a granular media bed in the first granular media filter and which is discharged from the first granular media filter. The effluent from the first granular media filter is further filtered in the second continuously operating granular media filter such that the effluent from the second granular media filter is clarified water and a second reject discharged from the second granular media filter contains impurities separated from a granular bed in the second granular media filter. In order to reduce the pollutants in the first and second rejects, the first and second reject water being discharged from respectively the first and second continuously operated granular media filters is separately treated by gravity separation, membrane filtration, two stage or multistage filtration or filtration or any combination thereof so that cleaned water is created that meets quality standards and a sludge is created that can be disinfected and/or dewatered and processed by suitable hygienic measures. In addition, chemicals for coagulation/flocculation may be added and the liquid to be processed may be subjected to a disinfecting treatment and/or a mechanical, biological and/or chemical treatment.

23 Claims, 9 Drawing Sheets

SEQUENTIAL DESCENDING BED FILTERS WITH REJECT/WASHWATER CONTAINING IMPURITIES BEING FED TO A SEPARATE UNIT FOR ELIMINATION OF IMPURITIES

BACKGROUND OF THE INVENTION

1. Field of the Invention

The present invention relates to the treatment of water/wastewater, and more particularly, to a new and improved method and apparatus for removing impurities/pollutants from water/wastewater by separately treating the reject from each of the stages of a two-stage continuously operated granular media filtration system.

2. Background of the Invention

In connection with municipal and many industrial water treatment systems, the water/wastewater needs to be purified. For example, one such system may be a drinking water system where drinking water is produced from surface water and another system may be a municipal wastewater treatment wherein the wastewater needs to be treated so that it can be discharged or reused in industry or for irrigation and similar purposes. In order for such treated water to be useful, pathogens, protozoans, phosphorus and other pollutants need to be removed from the water/wastewater. More-over, organisms, such as Crypt sporidium and Giardia and their oocysts and/or cysts, need to be removed from the water/wastewater.

In such a purification process, the water/wastewater can be subjected to precipitation and/or flocculation. In this regard, conventional chemical purification can include one or more flocculation tanks in which the water/wastewater is agitated with stirrers or agitators. Thereafter, the water/wastewater passes through one or more sedimentation basins after appropriate chemicals have been added. One of the disadvantages of conventional chemical purification processes is the large area required for the flocculation tanks and sedimentation basins. A further disadvantage of conventional chemical purification techniques is the long time that the water needs to remain in the flocculation tank as well as the sedimentation basin.

The use of flocculation tanks and sedimentation basins alone in the chemical purification process does not typically result in a high enough water purity for many applications. While membrane filtration with a suitably tight membrane can be used to attain a higher level of purification, such membrane filters are expensive and have other disadvantages. On the other hand, a granular media filter, for example, a sand filter, can be added at the end of the purification step to increase the purity of the water being treated. The sand in such sand filters must be cleaned. In some such filters, the sand is cleaned by back-washing it at frequent intervals. In order to avoid shutting down the purification step, it is necessary to provide at least two sand filters, one of which is in use while the other is being back-washed.

The use of two different, separately operated sand filters can be avoided if a continuously operated sand filter of the type disclosed in U.S. Pat. Nos. 4,126,546 and 4,197,201 is utilized. In such a sand filter, the filter bed is continuously cleaned while the filter is in operation. In this regard, the dirtiest sand is taken out of the filter bed, washed and returned to the clean part of the sand bed. In this way, the filter does not have to be taken out of operation for back-washing. A similar type of continuously operating sand filter also is disclosed in U.S. Pat. No. 4,246,102. As disclosed in that patent, the liquid is treated with chemicals before being treated in the sand filter.

In the sand filters of these patents, the liquid is introduced into the lower part of the filter bed. Filtration takes place upwards through the sand bed which is moving downward. In case the sand filter is operated with chemicals being added as disclosed in U.S. Pat. No. 4,246,102, then precipitation/coagulation and/or flocculation occurs during this filtration process. Most of the suspended solids in the feed will be separated near the feed level, which results in the dirtiest sand being in the lower part of the filter. The sand bed is kept in a slow downward motion by an air-lift pump that removes the dirtiest sand from a location close to the bottom of the filter tank. In the air-lift pump, the sand is subjected to a thorough mechanical agitation by the action of the air bubbles within the pump such that the dirt is separated from the grains of sand. The separated dirt is rinsed from the sand in a sand washer near the top of the air-lift pump, the sand washer being disposed concentrically around the upper part of the air-lift pump. The clean sand is returned to the top of the filter bed. Reject water is continuously removed from the sand washer and discharged from the sand filter whereas the filtrate exits from the sand filter as an overflow.

As is indicated in U.S. Pat. No. 4,246,102, the use of such a continuously operating sand filter with chemical treatment makes it possible to reduce the volume of liquid retained in the purification step to about one-tenth of that required for conventional processes. As a result, the area required for that step is reduced and the rate at which liquid passes through the purification step is increased. Moreover, considerably higher purity can be accomplished as compared to the purity attained with conventional techniques using flocculation tanks and sedimentation basins. Advantageously, the particulate filter material is being washed and returned to the filter bed continuously so that the filter material can accept a liquid which is quite dirty and/or contains considerable precipitates without any need for discontinuing the operation of the filter bed for the purpose of back-washing.

In order to further increase the purity level of the water being treated by such sand filters, two continuously operated sand filters can be operated in series with the filtrate exiting the first sand filter being introduced into the feed/input of the second sand filter. Such serial sand filters have been operated successfully in Europe (for example, in Holmsland, Denmark and Lairg, Scotland). However, the amount of reject from those filters and the amount of impurities in that reject makes it difficult and costly to dispose of the reject.

Another example where the sand filters of the type disclosed in U.S. Pat. Nos. 4,126,546, 4,197,201 and 4,246,102 are utilized is the wastewater management system disclosed in U.S. Pat. No. 5,843,308. This system includes two continuously operated sand filters of the type disclosed in U.S. Pat. Nos. 4,126,546 and 4,197,201 with direct filtration of the type disclosed in U.S. Pat. No. 4,246,102. According to U.S. Pat. No. 5,843,308, the sand filters are operated in series in order to eliminate or substantially reduce phosphorus, pathogens and protozoans (for example, Cryptosporidium and Giardia). Unlike the above noted European systems utilizing such sand filters in series, the reject water from the second sand filter is returned to the influent of the first sand filter and the reject water from only the first sand filter is directed to waste. It is the recirculation of the reject from the second sand filter back into the first sand filter that U.S. Pat. No. 5,843,308 asserts solves the problem of separating the above noted pollutants using the known method of operating two continuously operating sand filters in series. However, a system of the type disclosed in U.S. Pat. No. 5,843,308 does not actually provide a solution to the operation of sand filters in series, but instead creates a new and possibly more serious problem. In any such sand filter, the pollutants from the water being treated are concentrated in the reject (possibly in an order of magnitude of 20 times) that is discharged to waste. As a result, the reject from each sand filter has a high level of pollutants and in fact, the pollutants are in a significant concentration level within the reject. In view of the fact that floc fragments are difficult to separate from the reject without renewed precipitation and/or flocculation, the internal recirculation of the reject from the second sand filter that contains such pollutants to the input of the first sand filter results in the concentrated pollutants being returned to the first sand filter. This increases, rather than decreases, the chances that the pollutants will be in the treated water as it exits the second sand filter. Further, U.S. Pat. No. 5,843,308 indicates that the reject from the second sand filter is recycled into the first sand filter at a location downstream from the point where coagulants are added to the water/wastewater that is being treated in the system. Therefore, the recycled reject from the sand filter is not subjected to a renewed coagulation and/or flocculation which would otherwise enhance the chances that pollutants would be separated in the first sand filter. U.S. Pat. No. 5,843,308 also indicates that the preferred coagulant is poly-aluminum-silicate-sulfate (PASS). However, that type of coagulant reacts so quickly that flocculation is essentially immediate. Hence, any coagulation/flocculation carried out in the water/wastewater that is being supplied to the first sand filter is completed prior to the introduction of the reject from the second sand filter that is being recycled or reintroduced into the first sand filter.

In general, a system like the one disclosed in U.S. Pat. No. 5,843,308 wherein pollutants are separated by a two-step separation device and the pollutants separated in the second step are returned to the first step increases the risk for build-up and breakthrough of pollutants under real life operating conditions. In fact, the reliability of the system proposed in U.S. Pat. No. 5,843,308 is such that it might be necessary to supply a safety system consisting of two additional filter steps in series to those proposed in the patent to ensure that the separation will be reliable.

Accordingly, it is an object of the present invention to provide a new and improved method and apparatus for the treatment of water/wastewater.

It is another object of the present invention to provide a new and improved method and apparatus for the treatment of water/wastewater to remove pollutants, such as pathogens, protozoans, phosphorus and humus, from the water/wastewater being treated and thereafter separately treating those pollutants.

It is still another object of the present invention to provide a new and improved method and apparatus for the treatment of water/wastewater whereby impurities/pollutants are separated from the water/wastewater in a pair of granular media filters, such as sand filters, operated continuously in series and the reject from each of the two continuously operated granular media filters is separately treated.

It is yet another object of the present invention to provide a new and improved method and apparatus for the treatment of water/wastewater to remove pollutants from the water/wastewater being treated and thereafter separately treating those pollutants by gravity separation or membrane filtration or filtration or any combination thereof in order to produce treated water of a desired quality and a concentrate containing impurities which has a sufficiently low volume for the practical destruction or the rendering harmless of harmful substances removed from the water/wastewater.

SUMMARY OF THE INVENTION

In accordance with these and many other objects of the present invention, a treatment system for treating water/wastewater includes two continuously operating granular media filters, for example sand filters, that are operated together in series. The first and second granular media filters may have different types or sizes of filter media. In addition, chemicals for coagulation/flocculation may be added and the liquid to be processed may be subjected to a disinfecting treatment and/or a mechanical, biological and/or chemical treatment. The water/wastewater to be treated is introduced as an influent into the first of the granular media filters. The water/wastewater is treated within that first granular media filter such that treated, processed water/wastewater or effluent is produced and the impurities separated from the sand bed in the first granular media filter are discharged from the first granular media filter as a first reject. The effluent from the first granular media filter is further filtered in the second continuously operating granular media filter such that the effluent from the second granular media filter is clarified water and the impurities separated from the sand bed in the second granular media filter are discharged from the second granular media filter as a second reject. In order to reduce the pollutants in the first and second rejects, the first and second reject water being discharged from respectively the first and second continuously operated granular media filters are introduced into a separate treatment apparatus. In such a treatment apparatus, the pollutants separated from the water/wastewater being treated in the first and second serial granular media filters are subjected to a renewed treatment and/or separate treatment that eventually creates as its products cleaned water that meets quality standards and a sludge that can be dewatered and/or processed by suitable hygienic measures (e.g., sterilization). The separate treatment of the first and second reject water may consist of gravity separation, membrane filtration, two-stage or multi-stage filtration or filtration or any combination thereof. In this regard, sludge that is formed from the first and second reject water and that contains harmful substances can be treated to convert such harmful substances into harmless substances and/or the sludge can be dewatered and processed by suitable hygienic measures (e.g., sterilization).

BRIEF DESCRIPTION OF THE DRAWINGS

These and many other objects and advantages of the present invention will become readily apparent from consideration of the following detailed description of the embodiments of the invention shown in the accompanying drawings wherein.

DETAILED DESCRIPTION OF THE PREFERRED EMBODIMENT

Figure 1:
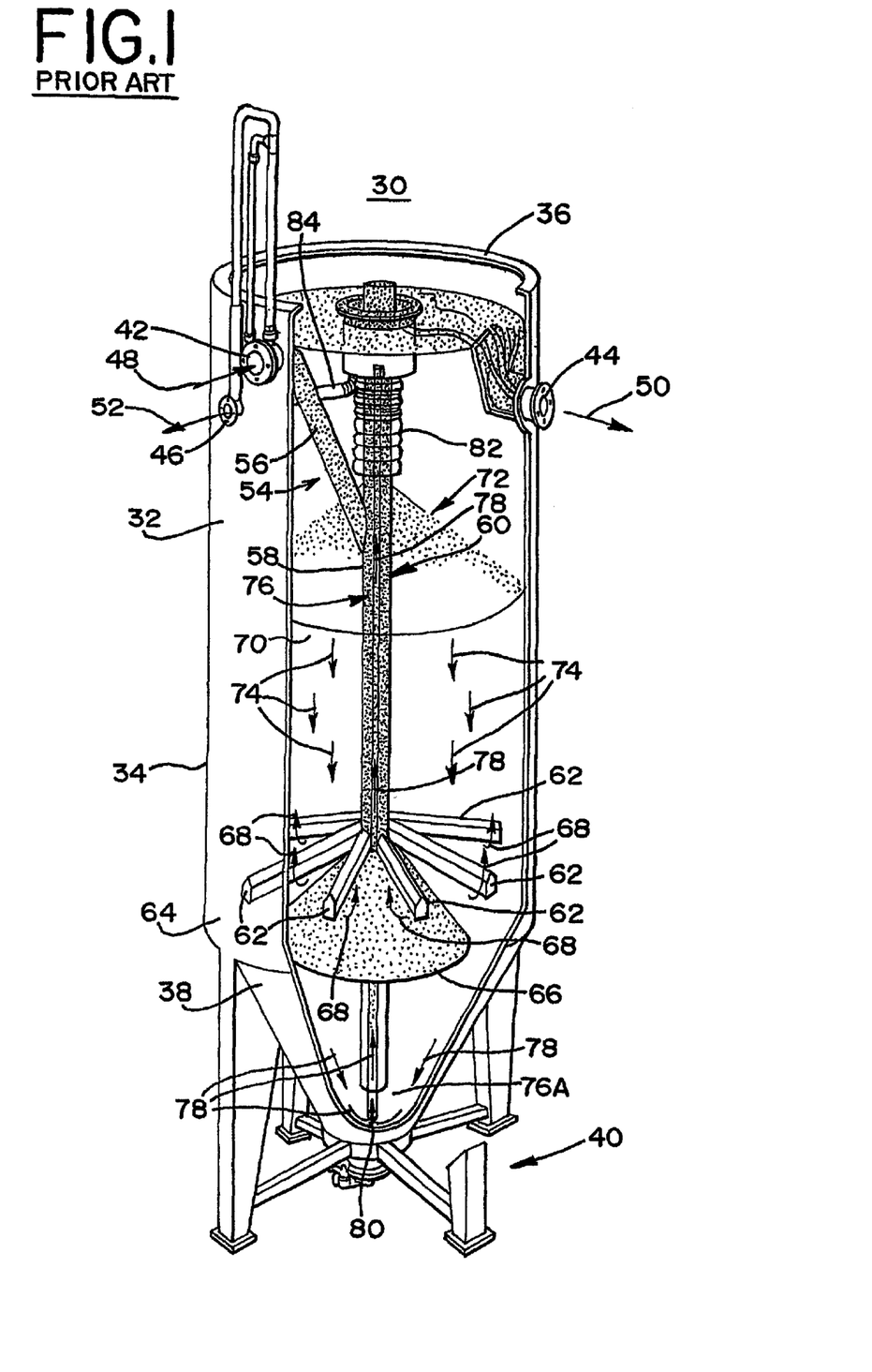
FIG. 1 is a perspective view of a prior art continuously operated sand filter for treating water/wastewater with a portion of the outer housing cut away go that the operation of the sand filter can be discerned.

Referring now more specifically to FIG. 1 of the drawings, therein is disclosed a prior art continuously operating sand filter 30 used in treating water/wastewater. Such a sand filter 30 is of the general type disclosed in U.S. Pat. Nos. 4,126,546, 4,197,201 and 4,246,102, the disclosures of which are incorporated herein by reference. As is discussed hereinafter, two such sand filters 30 are operated in series together with a separate treatment device as shown for example in FIG. 2 of the drawings in connection with the water/wastewater treatment system which is disclosed in that figure, which is generally designated by the reference numeral 100 and which embodies the present invention.

The sand filter 30 includes an outer housing or tank 32 having an outer, generally cylindrically shaped wall 34 extending from a top end 36 to a funnel-shaped bottom portion 38. The tank 32 is supported by a stand assembly 40 so that the tank 32 can be disposed in a vertical orientation as shown in FIG. 1 of the drawings with the stand assembly 40 extending downward from the outer wall 34 and around the funnel-shaped bottom portion 38. The sand filter 30 includes an inlet port 42 and outlet ports 44 and 46. As indicated by an arrow 48, untreated water/wastewater is introduced into the tank 32 of the sand filter 30 through the inlet port 42, as indicated by an arrow 50, treated water/wastewater is discharged from the outlet port 44, and as indicated by an arrow 52, reject from the sand filter 30 is discharged from the outlet port 46.

The water/wastewater to be treated (influent) is introduced through the inlet port 42 and flows into the inlet port 42 in the direction of the arrow 48. The influent flows from the inlet port 42 through an inlet or feed duct 54 that includes a diagonally oriented duct portion 56 and a vertically oriented duct portion 58 that extends concentrically about a central vertical riser 60. The influent flows through the feed duct 54 to distribution hoods 62 (only six of the distribution hoods 62 are illustrated in the sand filter 30 shown in FIG. 1, but the sand filter 30 will typically include eight such distribution hoods 62 distributed equally around the riser 60) that extend radially from the riser 60 near a lower portion 64 of the wall 34 and just above or through an upper part of a funnel-shaped hood 66. The influent is discharged into the tank 32 from the lower portions of the distribution hoods 62 as is represented by arrows 68. A sand bed 70 includes a filter medium that fills the tank 32 from the bottom funnel-shaped portion 38 to approximately a level generally indicated by the reference numeral 72. The discharging of the influent from below the distribution hoods 62 tends to prevent the filter medium from coming in direct contact with outlets in the distribution hoods 62. By this arrangement, the risk of clogging of the outlets in the distribution hoods 62 by the filter medium close to the outlets is reduced. As further indicated by the arrows 68, the influent will rise upward in the tank 32 so that it flows through the sand bed 70.

The influent being discharged from the distribution hoods 62 rises through the sand bed 70 and filtration of the influent takes place as the filter medium is traveling slowly downward in the tank 32 as indicated by arrows 74. The arrangement of the distribution hoods 62 in the lower part of the filter bed 70 has the advantage that most of the suspended solids in the influent will be separated near the level at which the distribution hoods 62 are disposed. As a result, the most dirty portion of the filter medium continues downwards and is no longer utilized in the filtration process until it has been cleaned.

The slow downward movement of the filter medium in the sand bed 70 is caused by an air-lift pump 76 that extends in the riser 60. Compressed air is supplied to an air lift chamber at 76A of the air-lift pump 76 near the bottom of the riser 60 through an air supply line (not shown) extending down through the riser 60. The air is introduced into the air-lift pump 76 from the air chamber at 76A. The air lift pump 76 will contain a mixture of liquid, air and granular filter medium during operation thereof. The mixture of liquid, air and granular filter medium has a lower density than the surrounding liquid causing the mixture to rise in the air-lift pump 76. As this mixture rises in the air-lift pump 76, filter medium and liquid near the bottom of the bed 70 in the funnel-shaped bottom portion 38 of the tank 32 will flow as indicated by arrows 78 through an inlet 80 of the air-lift pump 76 extending out of the lower part of the riser 60. By having the inlet 80 near the bottom of the tank 32, the dirtiest of the filter medium tends to flow into and upward in the air-lift pump 76.

As the dirty filter medium (sand) flows upward in the air-lift pump 76, the sand is subjected to a thorough mechanical agitation by the action of the air bubbles within the air-lift pump 76 and the dirt is separated from the grains of sand. The mechanical agitation and turbulence created by the action of the air bubbles in the air-lift pump 76 is so intense that some microorganisms will be killed by such action. In order to further clean the sand particles, the sand is washed in a washer 82 which is located near the top end of the riser 60 and disposed concentrically around the air-lift pump 76. The cleaned sand from the washer 82 is returned to the top of the sand bed 70 whereas the reject from the washer 82 flows from the washer 82 through a discharge duct 84 so as to be discharged through the outlet port 46 as indicated by the arrow 52. On the other hand, the treated water or filtrate flows as an overflow near the top 36 of the tank 32 and is discharged as an effluent through the outlet port 44 as indicated by the arrow 50.

As indicated heretofore, sand filters of the type of the sand filter 30 illustrated in FIG. 1 have been used in series in situations where a higher degree of purification/filtration is desired than that obtained from one such sand filter 30. However, an even higher level of purification can be obtained if the sand filters of the type of the sand filter 30 is used in the water/wastewater treatment system 100 which is disclosed in FIG. 2 of the drawings and which embodies the present invention. The water/wastewater treatment system 100 includes a first sand filter 30A and a second sand filter 30B, each of which is essentially identical to the sand filter 30 illustrated in FIG. 1, and a separate treatment apparatus 102. In the particular water/wastewater treatment system 100 illustrated in FIG. 2 of the drawings, two sand filters 30A and 30B are disclosed, but it should be understood that in connection with the present invention any suitable type of granular media filter can be used in place of either or both of the sand filters 30A and 30B. In view of the fact that the sand filters 30A and 30B are essentially identical to the sand filter 30, the same components of the sand filters 30A and 30B that are specifically referred to herein are referenced by the same reference numerals as the corresponding components in the sand filter 30 except that respectively the letters "A" and "B" have been added to those reference numerals. For the purposes of clarity, the reference numerals of all of the components of the sand filters 30A and 30B are not included in FIG. 2 of the drawings, but instead only those specifically referred to hereinafter.

Figure 2:
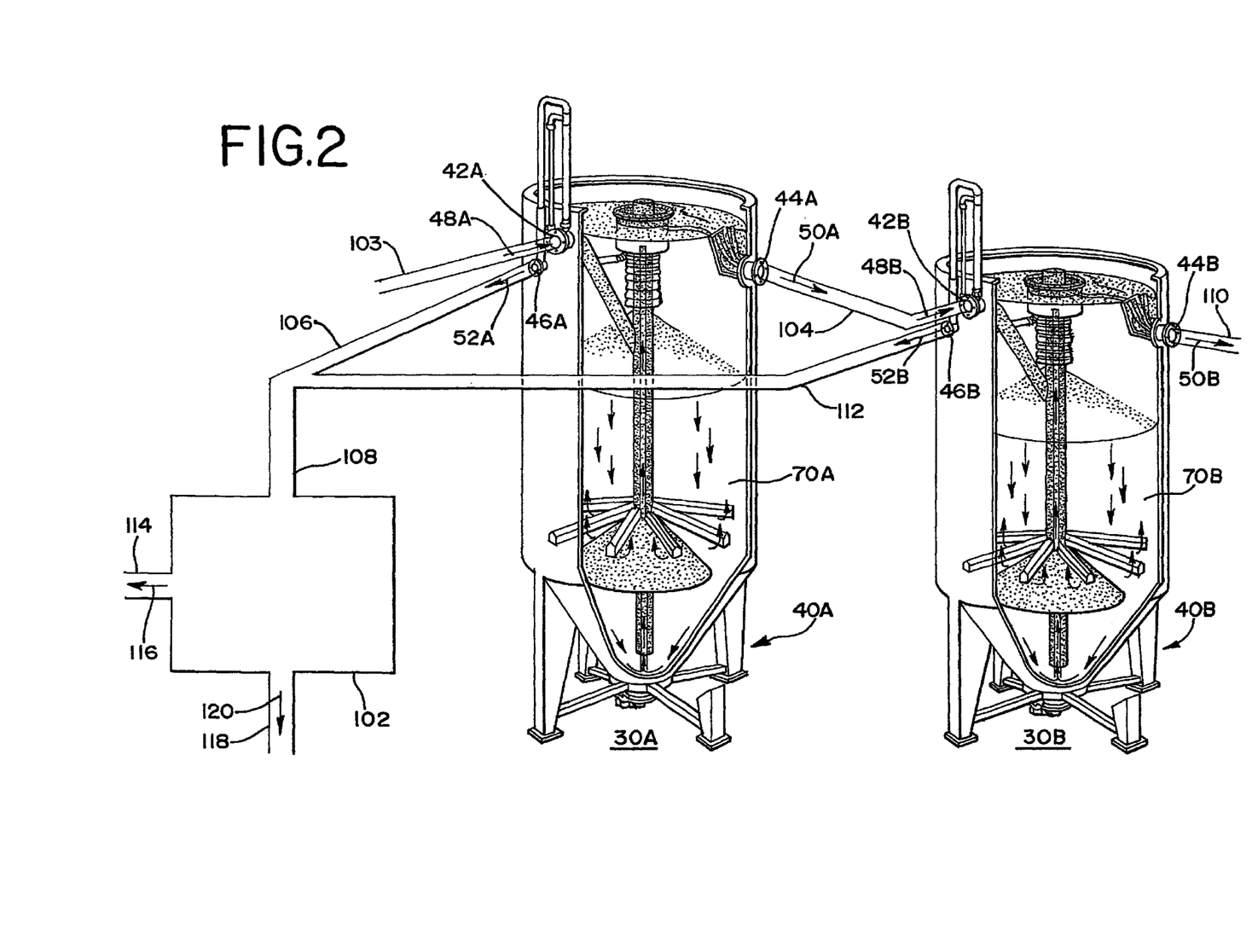
FIG. 2 is in part a perspective view and in part a diagrammatic view of a water/wastewater treatment system embodying the present invention which includes two sand filters of the type disclosed in FIG. 1 operated in series and a separate treatment apparatus for treating the reject from both of the sand filters.

In the water/wastewater treatment system 100, the water/wastewater to be treated is introduced as an influent into the first sand filter 30A through an inlet duct 103 and an inlet port 42A as indicated by an arrow 48A. The influent is treated within that first sand filter 30A in the same manner that water/wastewater is treated in the sand filter 30. As a result, a first treated, processed water/wastewater or effluent and a first reject containing impurities separated from the sand bed 70A in the first sand filter 30A are produced. This first effluent is discharged through an outlet port 44A into a linking duct 104 as indicated by an arrow 50A. The linking duct 104 couples the outlet port 44A to an inlet port 42B of the second sand filter 30B. As a result, the first effluent being discharged from the sand filter 30A flows through the linking duct 104 and into the inlet port 42B as a second influent for the second sand filter 30B as indicated by an arrow 48B. On the other hand, the first reject from the first sand filter 30A is discharged from an outlet port 46A into a reject duct 106 as indicated by an arrow 52A. The reject duct 106 is in fluid communication with an input duct 108 of the separate treatment apparatus 102 so that the first reject from the sand filter 30A flows to the separate treatment apparatus 102.

The second influent flowing into the inlet port 42B of the second sand filter 30B is treated within that second sand filter 30B in the same manner that water/wastewater is treated in the sand filter 30. As a result, a second treated, processed water/wastewater or effluent and a second reject containing impurities separated from the sand bed 70B in the second sand filter 30B are produced. This second effluent is discharged through an outlet port 44B into an outlet duct 110 as indicated by an arrow 50B so that the purified liquid being discharged through the outlet duct 110 can be used as drinking water if the first influent is from surface water or can be used in industry or in irrigation and similar purposes if the first influent is from a municipal wastewater treatment facility. On the other hand, the second reject from the second sand filter 30B is discharged from an outlet port 46B into a reject duct 112 as indicated by an arrow 52B. The reject duct 112 is in fluid communication with the input duct 108 of the separate treatment apparatus 102 so that the second reject from the sand filter 30B also flows along with the first reject from the sand filter 30A to the separate treatment apparatus 102.

The sand filters 30A and 30B are disclosed in FIG. 2 as being free-standing units supported on stand assemblies 40A and 40B respectively. Alternatively, the sand filters 30A and 30B can be multiple modules within a filter, such as a concrete tank in which multiple filter modules are disposed. Moreover, the sand filters 30A and 30B are shown in FIG. 2 as being of two different heights with the second sand filter 30B being of a somewhat different, lesser height so that as the effluent from the first sand filter 30A exits the outlet port 44A it will flow in the duct 104 to the inlet port 42B. This difference in the levels of the outlet port 44A and the inlet port 42B eliminates the necessity of having to pump the effluent in the duct 104 between the port 44A and the port 42B and through the sand filter 30B. On the other hand, the sand filters 30A and 30B can be of the same size but the sand filter 30A would be positioned at higher level than the sand filter 30B.

The sand beds 70A and 70B respectively of the first and second sand filters 30A and 30B may be of different depths and may have different types or sizes of filter media. In fact, the filter media for the two sand filters 30A and 30B may be chosen independently. For example, the filter media in the sand beds 70A and 70B may be silica sand. Each of the sand beds 70A and 70B may include sand of the same or different particle sizes (for example, the filter media in the first sand filter 30A may have a bigger particle size than the filter media in the second sand filter 30B) and may be of the same or different density (for example, the filter media in the first sand filter 30A may have a lower density than the filter media in the second sand filter 30B). On the other hand, the filter media in the first sand filter 30A may be silica sand and the filter media in the second sand filter 30B may be garnet. In addition and as is discussed further hereinafter, the first influent prior to its introduction into the inlet port 42A of the first sand filter 30A may be mechanically treated, chemicals for coagulation/flocculation may be added to the first influent prior to its introduction into the inlet port 42A of the first sand filter 30A; and/or the first influent prior to its introduction into the inlet port 42A of the first sand filter 30A may be biologically treated.

As previously indicated, the first and second rejects from the first and second sand filters 30A and 30B are introduced into the separate treatment apparatus 102 through the input duct 108. The first and second rejects are processed in the separate treatment apparatus 102 so as to ensure that the pollutants separated from the water/wastewater being treated in the first and second serial sand filters 30A and 30B are subjected to a renewed treatment and/or separate treatment that eventually creates as its products cleaned water that meets quality standards and a sludge that can be dewatered and/or processed by suitable hygienic measures (e.g., sterilization). In this regard, the cleaned water produced in the separate treatment apparatus 102 is discharged to an outlet duct 114 as indicated by an arrow 116 whereas the sludge is discharged to a discharge duct 118 as indicated by an arrow 120.

The separate treatment apparatus 102 for the first and second reject water may consist of gravity separation, membrane filtration, two stage or multistage filtration or filtration or any combination thereof. The particular treatment that is selected is dependent on ensuring that the treatment will produce a treated water of the desired quality for discharge or use of the liquid. More specifically, the treatment needs to ensure that a liquid will be produced at the outlet duct 114 that fulfills the same quality criteria as the treated liquid being produced as the second effluent at the outlet duct 110 of the sand filter 30B. On the other hand and as is discussed hereinafter for example with respect to FIGS. 9–11, the liquid being discharged at the outlet duct 114 may be of such quality that it can be returned for further treatment together with the influent flowing in the inlet duct 103 into the first sand filter 30A without compromising the quality (purity) of the effluent being discharged through the outlet duct 110 from the second sand filter 30B.

The separate treatment in the treatment apparatus 102 also results in a highly concentrated reject being discharged at the discharge duct 118. The reject is of sufficiently low volume so that any harmful substances that were originally separated in the two first and second sand filters 30A and 30B can be destroyed or made harmless in a practical way. In other words, the volume of the reject flowing from the discharge duct 118 is significantly less than the volume of the first and second rejects flowing respectively from the outlet ports 46A and 46B due to the treatment of the water/wastewater in the sand filters 30A and 30B.

As indicated, the first and second rejects may be subjected to gravity separation at the treatment apparatus 102. Such gravity separation may be either by sedimentation, by compact settling or by enhanced gravity separation (for example, a hydrocyclone or centrifugal separator). On the other hand, filtration can be used in the treatment apparatus 102. In such a case, the first and second rejects are filtered through a suitable filter medium, such as a particulate or a textile type filter media (for example, a filter cartridge). When the first and second rejects are subjected to membrane filtration at the treatment apparatus 102, microfiltration, nanofiltration, ultrafiltration or reverse osmosis through organic or inorganic media may be used.

Figure 3:
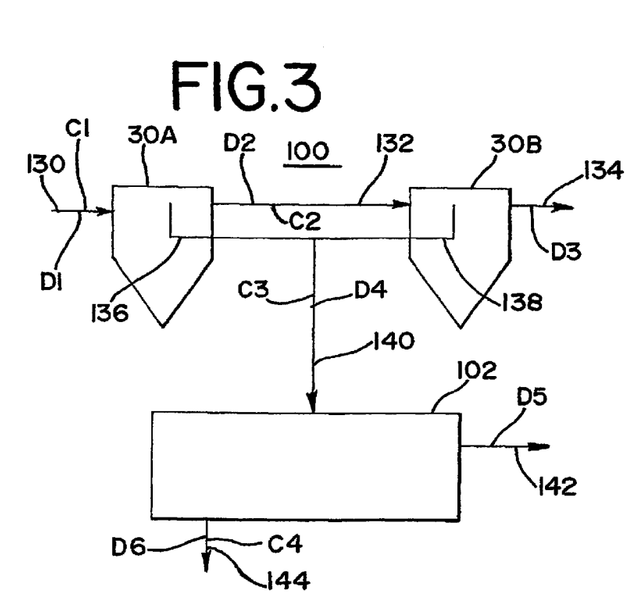
FIG. 3 is a schematic diagram of the water/wastewater treatment system of FIG. 2.

Now referring to FIG. 3 of the drawings, the water/wastewater treatment system 100 is schematically illustrated therein. The water/wastewater treatment system 100 includes the sand filters 30A and 30B that are operated continuously in series. As illustrated therein, a first influent flows into the first sand filter 30A as schematically shown by an arrow 130. The treated first effluent produced by the first sand filter 30A flows from the sand filter 30A as a second influent that flows into the second sand filter 30B as indicated by an arrow 132. The treated second effluent produced by the second sand filter 30B flows from the sand filter 30B as indicated by an arrow 134. On the other hand, the first and second rejects respectively discharged from the sand filters 30A and 30B flow to the separate treatment apparatus 102 as is indicated by arrows 136, 138 and 140. Once the rejects from the sand filters 30A and 30B are treated in the treatment apparatus 102, the cleaned water produced in the separate treatment apparatus 102 flows out from the treatment apparatus 102 as indicated by an arrow 142 whereas sludge is discharged from the treatment apparatus 102 as indicated by an arrow 144.

Figure 4:
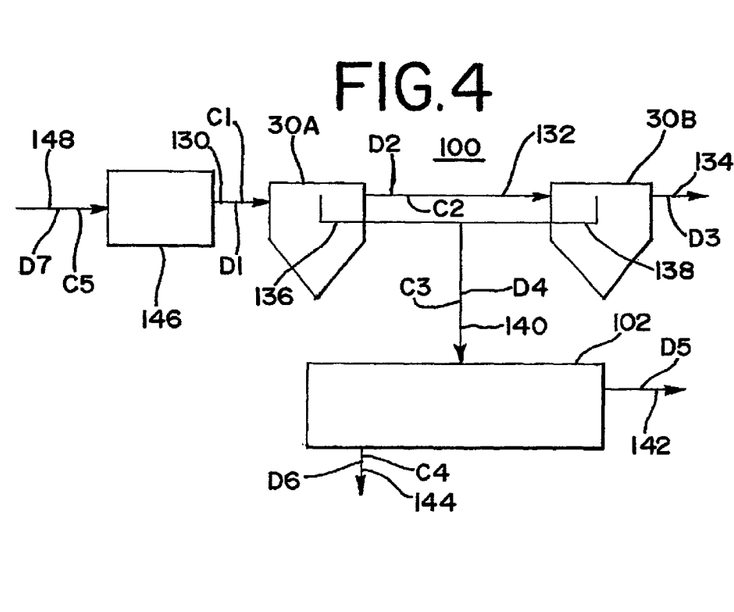
FIG. 4 is a schematic diagram of the water/wastewater treatment system of FIG. 2 provided with an additional preliminary mechanical treatment apparatus.
Figure 5:
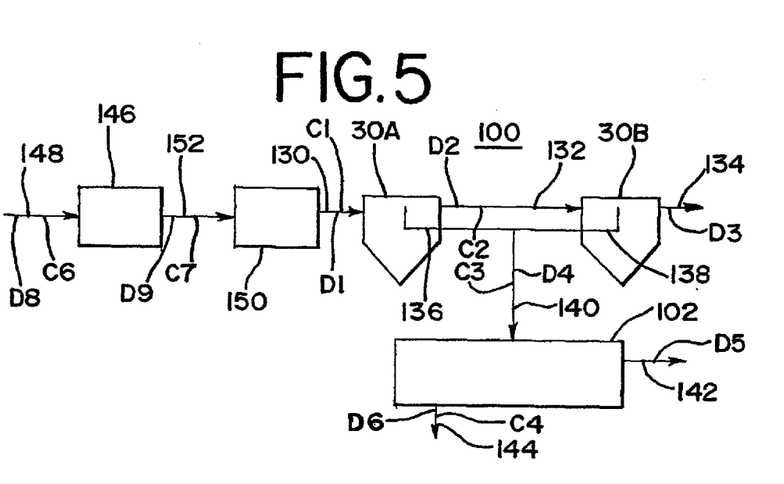
FIG. 5 is a schematic diagram of the water/wastewater treatment system of FIG. 2 provided with additional preliminary mechanical and biological treatment apparatus.
Figure 6:
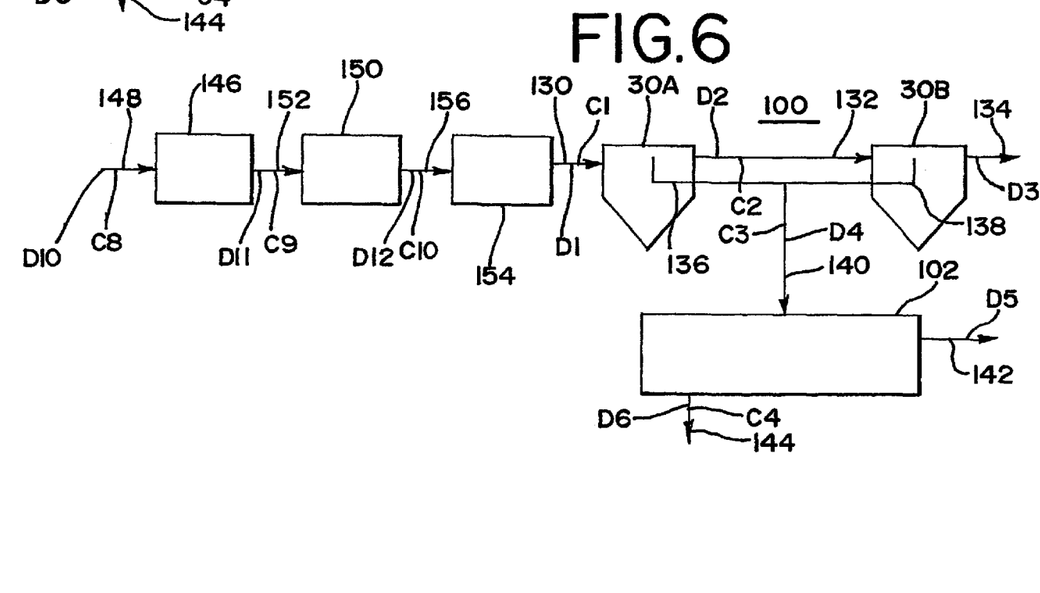
FIG. 6 is a schematic diagram of the water/wastewater treatment system of FIG. 2 provided with additional preliminary mechanical, biological, and chemical treatment apparatus.

FIGS. 4–6 illustrate schematically additional processes that may be used in conjunction with the water/wastewater treatment system 100. In the case of FIG. 4, the first influent is subjected to a mechanical treatment prior to the first influent flowing into the first sand filter 30A as indicated by the arrow 130. As indicated in that FIG. 4, the first influent flows into a mechanical treatment apparatus 146 as indicated by an arrow 148 prior to being introduced into the first sand filter 30A. The mechanical treatment apparatus 146 alternatively may be a sand trap and/or some type of screen and/or a settling device. Between the mechanical treatment apparatus 146 and the first sand filter 30A, the first influent can be subjected to a biological treatment. As is illustrated in FIG. 5, the first influent flows into a biological treatment apparatus 150 as indicated by an arrow 152 following being mechanically treated in the mechanical treatment apparatus 146 and prior to being introduced into the sand filter 30A. In addition, the first influent can be chemically treated prior to its flowing into the sand filter 30A. In this regard, FIG. 6 illustrates schematically that a chemical treatment apparatus 154 can receive the first influent as it flows out of the biological treatment apparatus 150 as indicated by an arrow 156.

In addition to the treatment of the water/wastewater by the sand filters 30A and 30B in the water/wastewater treatment system 100, disinfection chemicals can be added to the liquids flowing into and out of the sand filters 30A and 30B and the separate treatment apparatus 102. The disinfection can be accomplished at any of the locations D1, D2, D3, D4, D5 or D6 indicated in the schematic of FIG. 3. The disinfection can be carried out at any of the locations D1, D2, D3, D4, D5 or D6 individually or in combination with disinfection at one or more of the other locations (any combination of the disinfection locations is possible). In the cases where additional mechanical, biological and/or chemical treatment apparatus are provided upstream of the water/wastewater treatment system 100, disinfection can be accomplished at, for example, location D7 in the schematic of FIG. 4, locations D8 and D9 in the schematic of FIG. 5, and locations D10, D11 and D12 in the schematic of FIG. 6. In fact, the disinfection may take place at one or more of the indicated locations. The disinfection can be accomplished by any type of disinfection but disinfection agents such as chlorine or any chlorine containing compound, ozone or any oxygen containing disinfectant or compound, or UV light can be used.

In order to aid the filtering process of the water/wastewater treatment system 100, coagulation and/or flocculation chemicals can be added to the water/wastewater being treated in the water/wastewater treatment system 100. Again with reference to FIG. 3 of the drawings, the locations C1, C2, C3 and C4 are where such coagulation and/or flocculation chemicals can be added. The addition of such chemicals can be at any of the locations C1, C2, C3 and C4 individually or in combination with chemicals added at one or more of the other locations. In fact, any combination of the chemicals addition locations is possible. In the cases where additional mechanical, biological and/or chemical treatment apparatus are provided upstream of the water/wastewater treatment system 100, coagulation and/or flocculation chemicals also can be added. In this regard, location C5 in the schematic of FIG. 4, locations C6 and C7 in the schematic of FIG. 5, and locations C8, C9 and C10 in the schematic of FIG. 6 indicate further locations where chemicals can be added to the water/wastewater that is to be treated in the water/wastewater treatment system 100. In fact, the addition of such chemicals may take place at one or more of the indicated locations. Moreover, pH-adjusting chemicals may be added to the liquid prior to the addition of the coagulation and/or flocculation chemicals irrespective of which addition location or locations are chosen.

Figure 7:
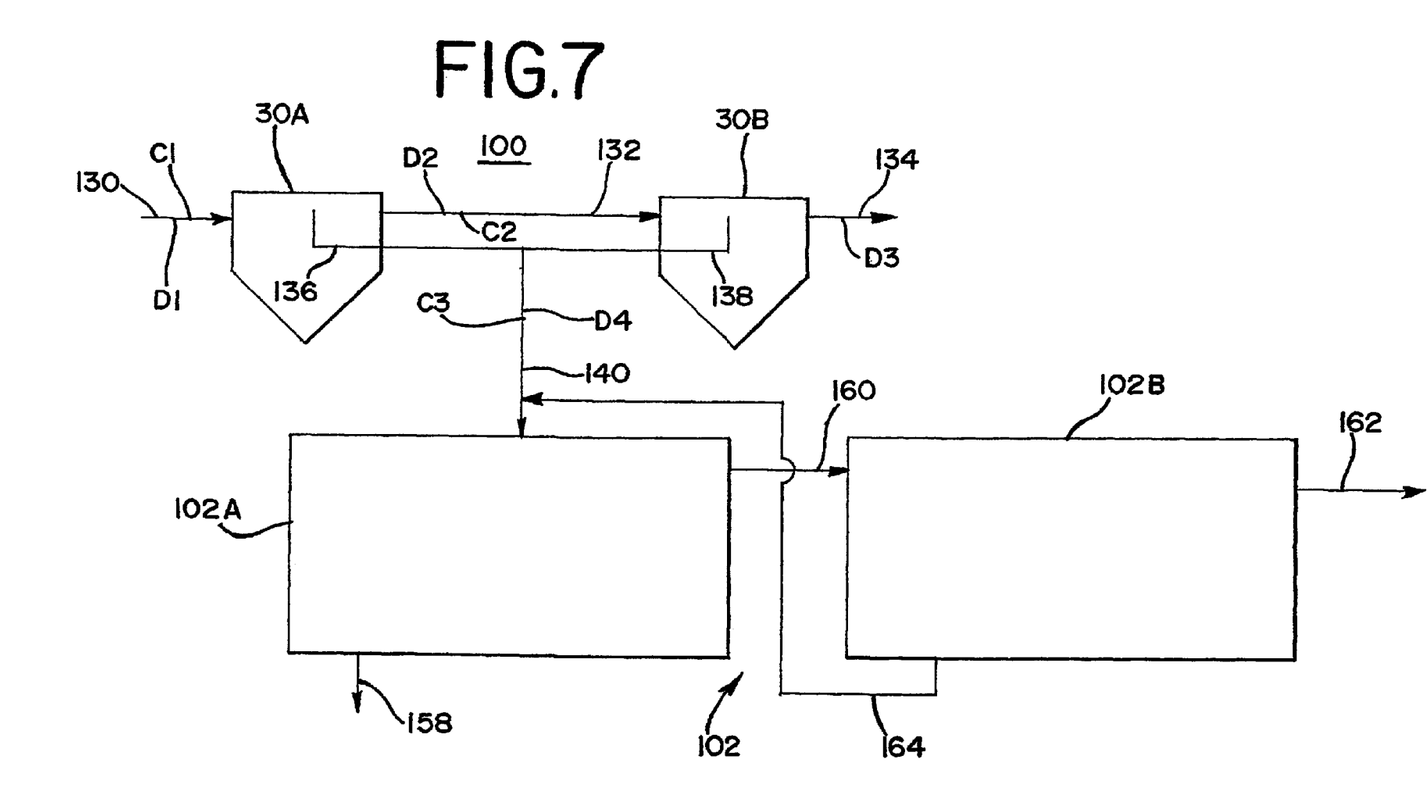
FIG. 7 is a schematic diagram of the water/wastewater treatment system of FIG. 2 provided with dual separate treatment apparatus.
Figure 8:
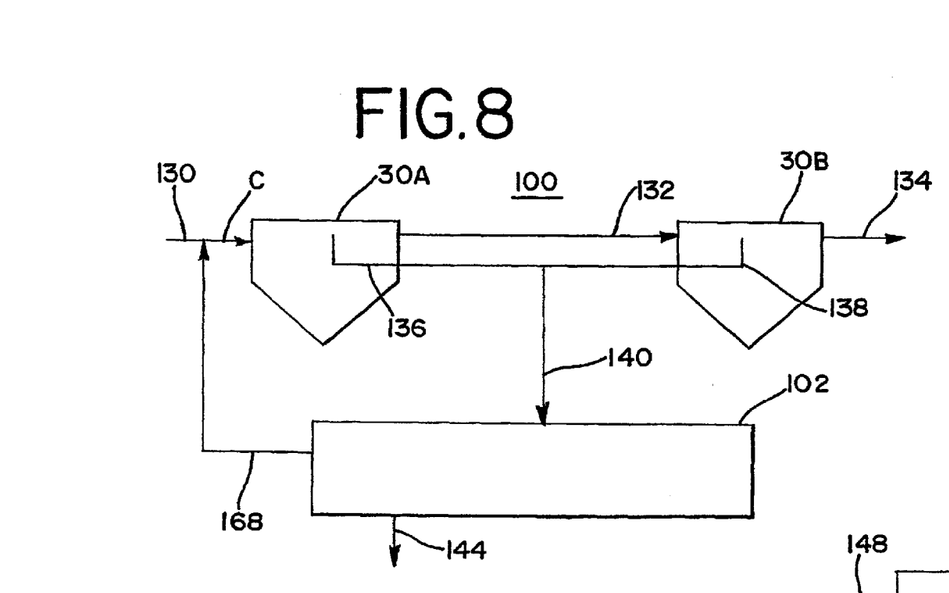
FIG. 8 is a schematic diagram of the water/wastewater treatment system of FIG. 2 with the treated liquid being returned to the input of the water/wastewater treatment system after being separately treated.

As indicated heretofore, the first and second rejects from the sand filters 30A and 30B can be subjected to gravity separation, filtration, membrane filtration or two stage or multistage filtration in the separate treatment apparatus 102. Alternatively, the first and second rejects can be subjected to a combination of such treatments. In this regard, FIG. 7 illustrates such a combination of treatments. As shown in FIG. 7, the separate treatment apparatus 102 is subdivided into treatment apparatus 102A and 102B. The first and second rejects flowing from the sand filters 30A and 30B as indicated by the arrows 136, 138 and 140 are introduced into the treatment apparatus 102A and can be subjected therein to gravity separation, filtration, two stage or multistage filtration or membrane filtration. The sludge produced in the treatment apparatus 102A is discharged from the treatment apparatus 102A as indicated by an arrow 158. On the other hand, the cleaned water produced in the treatment apparatus 102A flows out from the treatment apparatus 102A to the treatment apparatus 102B as indicated by an arrow 160. This cleaned water is further treated in the treatment apparatus 102B by membrane filtration, two stage or multistage filtration or filtration. The cleaned water from the treatment apparatus 102B flows out from the treatment apparatus 102B as indicated by an arrow 162. On the other hand, the sludge produced in the treatment apparatus 102B is returned to the treatment apparatus 102A as indicated by an arrow 164 so that it can be further processed in the treatment apparatus 102A and 102B or in the alternative, discharged in the same manner that the sludge is discharged from the treatment apparatus 102A as indicated by the arrow 158.

FIGS. 8, 9, 10 and 11 correspond generally respectively to FIGS. 3, 4, 5 and 6. The difference is that in each of the systems disclosed in FIGS. 8, 9, 10 and 11 the treated liquid from the separate treatment apparatus 102 is returned to the input of the sand filter 30A of the treatment system 100 so that the liquid can be further treated. In the case of the system depicted schematically in FIG. 8, the cleaned liquid being discharged from the separate treatment apparatus 102 flows to the input of the sand filter 30A as indicated by an arrow 168. As a result, the cleaned liquid from the separate treatment apparatus 102 flows into the sand filter 30A along with the influent to that sand filter 30A as indicated by the arrow 130. As a result, the cleaned liquid from the separate treatment apparatus 102 is further treated in the water/wastewater treatment system 100. In connection with the reintroduction of the cleaned liquid from the treatment apparatus 102, FIG. 8 further indicates that that cleaned liquid can be combined with the influent for the sand filter 30A upstream of a location C where coagulation/flocculation chemicals may be added to the influent being introduced into the sand filter 30A as indicated by the arrow 130.

Figure 9:
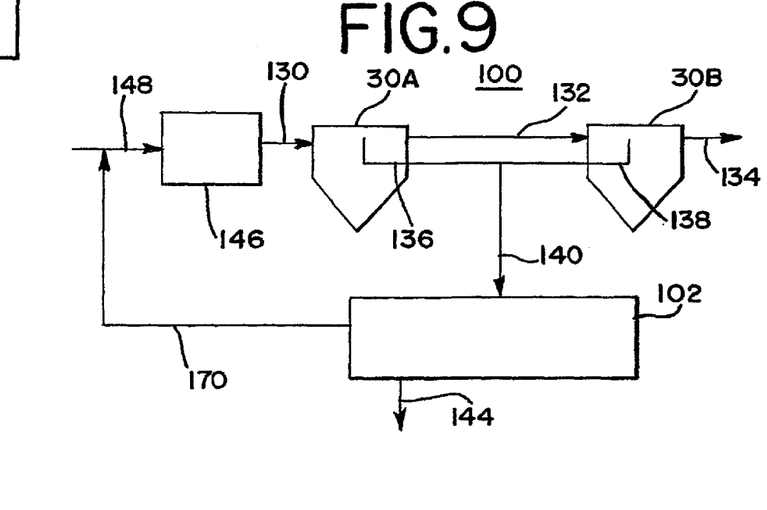
FIG. 9 is a schematic diagram of the water/wastewater treatment system of FIG. 4 with the treated liquid being returned upstream of the mechanical treatment after being separately treated.
Figure 10:
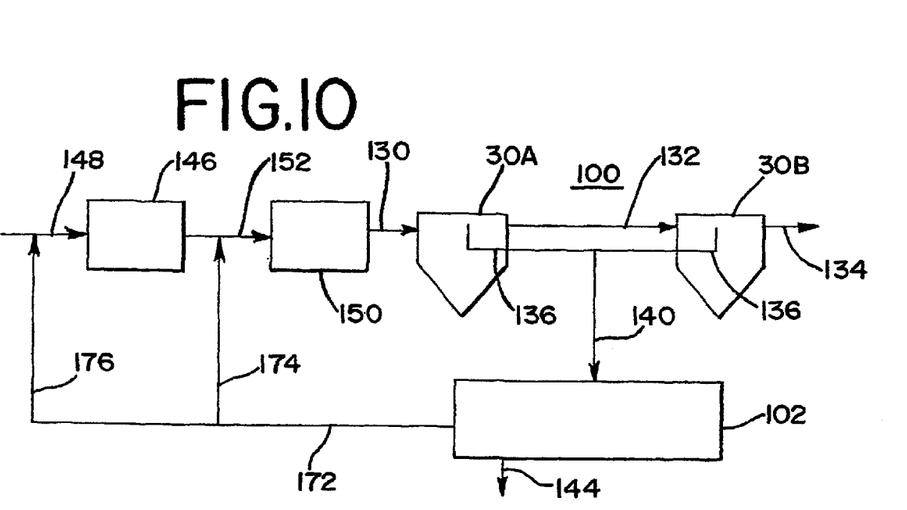
FIG. 10 is a schematic diagram of the water/wastewater treatment system of FIG. 5 with the treated liquid after being separately treated being returned upstream of either the mechanical or biological treatment.
Figure 11:
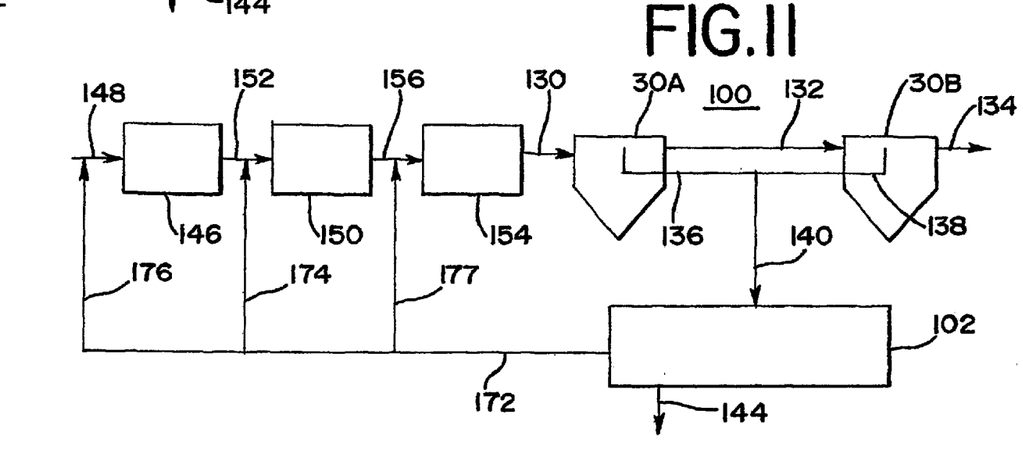
FIG. 11 is a schematic diagram of the water/wastewater treatment system of FIG. 6 with the treated liquid after being separately treated being returned upstream of either the mechanical treatment, the biological treatment or the chemical treatment.

In the case of the systems depicted schematically in FIGS. 9–11, the cleaned liquid being discharged from the separate treatment apparatus 102 also is returned to the water/wastewater treatment system 100 for further treatment. As shown in FIG. 9, the system therein depicted includes a mechanical treatment apparatus 146 through which the influent flows and in which the influent is treated before being introduced into the water/wastewater treatment system 100. The cleaned liquid flowing from the separate treatment apparatus 102 as indicated by an arrow 170 is returned upstream of where the influent is introduced into the mechanical treatment apparatus 146 as is indicated by the arrow 148. In the case of the system depicted in FIG. 10, the influent flows through and is treated in a mechanical treatment apparatus 146 and a biological treatment apparatus 150 before it is introduced into the water/wastewater treatment system 100. As is illustrated by arrows 172, 174 and 176, the cleaned liquid being discharged from the separate treatment apparatus 102 is introduced upstream of either the mechanical treatment apparatus 146 (as depicted by the arrow 176 which indicates that the cleaned liquid can be combined with the influent as it is flowing into the mechanical treatment apparatus 146 as indicated by the arrow 148) or the biological treatment apparatus 150 (as depicted by the arrow 174 which indicates that the cleaned liquid can be combined with the influent as it is flowing into the biological treatment apparatus 150 as indicated by the arrow 152). In the case of the system depicted in FIG. 11, the influent flows through and is processed in a mechanical treatment apparatus 146, a biological treatment apparatus 150, and a chemical treatment apparatus 154 before it is introduced into the water/wastewater treatment system 100. As is illustrated by arrows 174, 176 and 177, the cleaned liquid being discharged from the separate treatment apparatus 102 is introduced upstream of either the mechanical treatment apparatus 146 (as depicted by the arrow 176 which indicates that the cleaned liquid can be combined with the influent as it is flowing into the mechanical treatment apparatus 146 as indicated by the arrow 148), the biological treatment apparatus 150 (as depicted by the arrow 174 which indicates that the cleaned liquid can be combined with the influent as it is flowing into the biological treatment apparatus 150 as indicated by the arrow 152) or the chemical treatment apparatus 154 (as depicted by the arrow 177 which indicates that the cleaned liquid can be combined with the influent as it is flowing into the chemical treatment apparatus 154 as indicated by the arrow 156).

In the case of the systems depicted in FIGS. 9–11, chemicals can be added and/or disinfection can be carried out at the various positions and in the various combinations discussed heretofore in connection with the systems depicted in FIGS. 3–6. In such a case, the reintroduction of the cleaned liquid into the system 100 occurs upstream of the addition of the chemicals and/or disinfection.

Figures 12, 13:
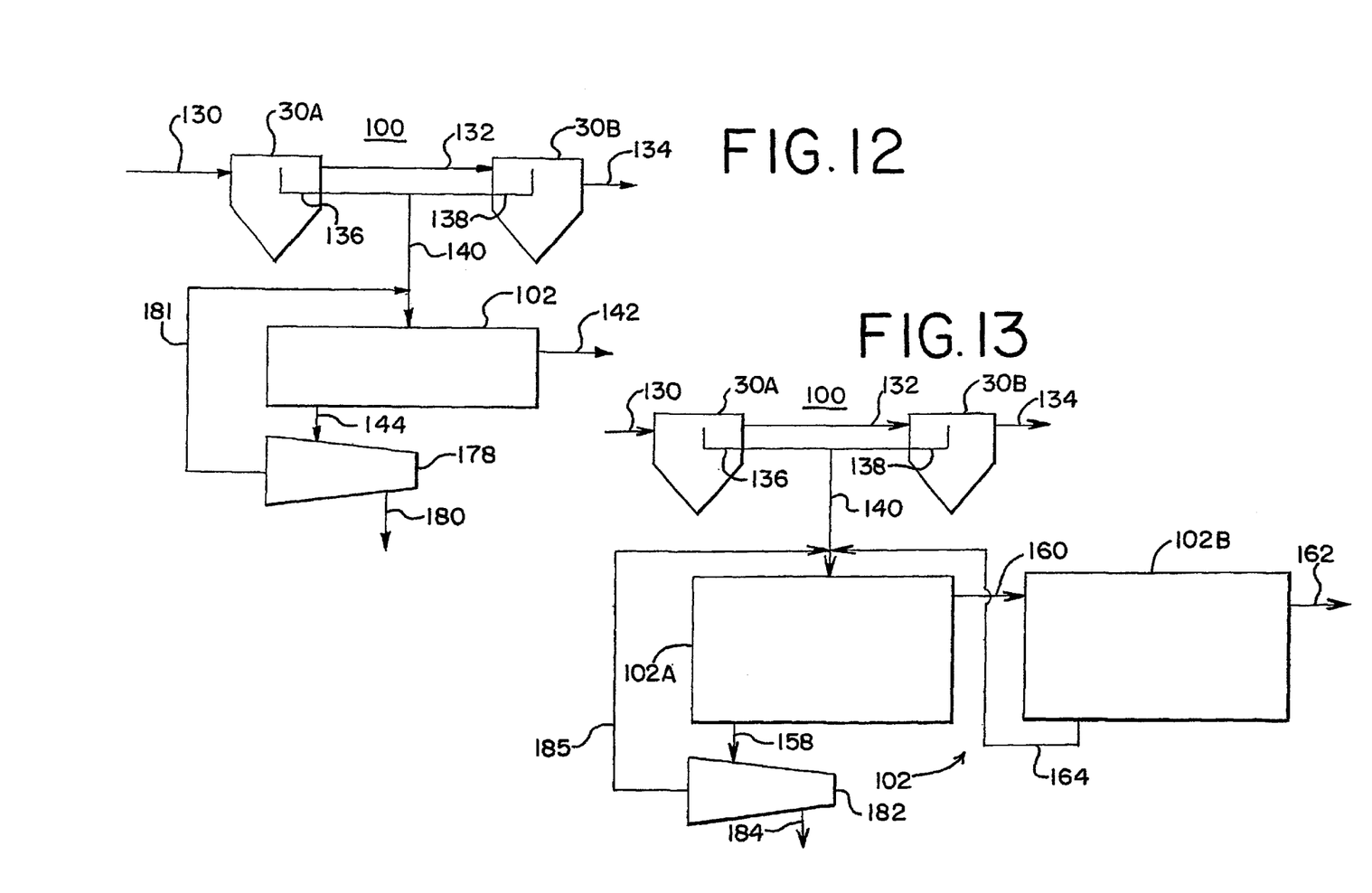
FIG. 12 is a schematic diagram of the water/wastewater treatment system of FIG. 2 provided with an additional sludge treatment apparatus.
FIG. 13 is a schematic diagram of the water/wastewater treatment system of FIG. 7 provided with an additional sludge treatment apparatus.

As previously indicated in connection with FIG. 3, one of the discharges from the separate treatment apparatus 102 is sludge that is discharged from the separate treatment apparatus 102 as indicated by the arrow 144. That discharged sludge can be further treated in a sludge treatment apparatus 178 depicted schematically in FIG. 12 of the drawings. In the sludge treatment apparatus 178, the sludge is thickened and/or dewatered with the treated sludge being discharged from the sludge treatment apparatus 178 as indicated by an arrow 180. A certain amount of the sludge that flows into the sludge treatment apparatus 178 is discharged as reject water. As illustrated by an arrow 181 in FIG. 12, this reject water can be returned to where the first and second rejects are introduced into the separate treatment apparatus 102 as indicated by the arrow 140. In a similar manner, the sludge produced in the separate treatment apparatus 102A and 102B of the system depicted schematically in FIG. 7 also can be further treated. In this regard, a sludge treatment apparatus 182 is schematically shown in FIG. 13 in connection with the system that is depicted in FIG. 7. The sludge being discharged from the treatment apparatus 102A is introduced into the sludge treatment apparatus 182 wherein it is thickened and/or dewatered. The so thickened and dewatered sludge is discharged from the sludge treatment apparatus 182 as indicated by an arrow 184. A certain amount of the sludge that flows into the sludge treatment apparatus 182 is discharged as reject water. As illustrated by an arrow 185 in FIG. 13, this reject water can be returned to where the first and second rejects are introduced into the separate treatment apparatus 102A as indicated by the arrow 140.

Figures 14, 15:
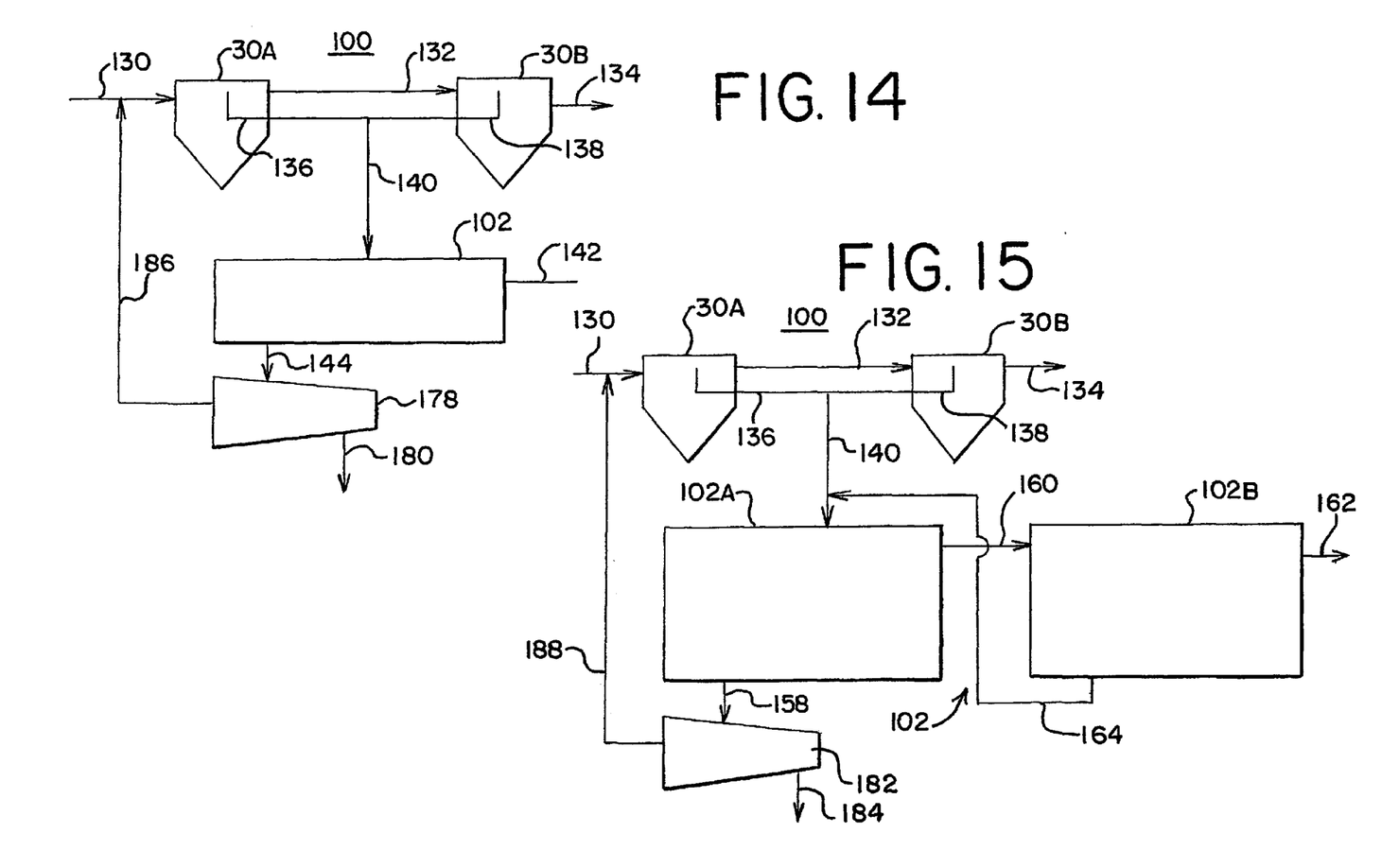
FIG. 14 is a schematic diagram of the water/wastewater treatment system of FIG. 12 with the reject from the additional sludge treatment apparatus being returned to the input of the water/wastewater treatment system.
FIG. 15 is a schematic diagram of the water/wastewater treatment system of FIG. 13 with the reject from the additional sludge treatment apparatus being returned to the input of the water/wastewater treatment system.

In the case of the system depicted in FIG. 12, a certain of amount of the sludge that flows into the sludge treatment apparatus 178 is discharged as reject water and is combined with the first and second reject water as indicated by the arrow 181 in FIG. 12 of the drawings. As indicated by an arrow 186 in FIG. 14, the reject water from the sludge treatment apparatus 178 alternatively can be returned to the influent being introduced into the sand filter 30A of the water/wastewater treatment system 100 (indicated by the arrow 130). Similarly, reject water produced in the sludge treatment apparatus 182 in the system depicted in FIG. 13 is combined with the first and second reject water as indicated by the arrow 185. Alternatively, the reject water from the sludge treatment apparatus 182 can be returned to the influent being introduced into the sand filter 30A of the water/wastewater treatment system 100. In this regard, reference is made to FIG. 15 of the drawings. As depicted therein, reject water is discharged from the sludge treatment apparatus 182 as indicated by an arrow 188. As further indicated by the arrow 188 in that FIG. 15, the reject water from the sludge treatment apparatus 182 is returned to the influent being introduced into the sand filter 30A of the water/wastewater treatment system 100 (indicated by the arrow 130). It is noted that the return of the reject water as indicated in FIG. 14 by the arrow 186 and in FIG. 15 by the arrow 188 would be upstream of where chemicals and/or disinfection are added to the influent flowing into the sand filter 30A (indicated by the arrow 130).

In describing above the water/wastewater treatment system 100 and the other treatments that can be used in connection with that system, reference has been made to such treatments as mechanical treatment, biological treatment, chemical treatment, filtration (including gravity, membrane, two stage, and multistage filtration) and disinfection. Information as to those treatments are in such references as (1) *Design of Municipal Wastewater Treatment Plants*, Volume I: Chapters 1–12 and Volume II: Chapters 13–20, WEF Manual of Practice No. 8, ASCE Manual and Report on Engineering Practice No. 76, 1992 and (2) Tchobanoglous and Burton, *Wastewater Engineering—Treatment, Disposal. and Reuse*, Metcalf & Eddy, Inc., Third Edition. To the extent pertinent, those references are incorporated herein by reference.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A method for treating a liquid having impurities therein, comprising:
    feeding said liquid as a first influent to a first serial continuously operated granular media filter;
    treating said first influent in said first granular media filter to produce a first effluent and a first reject;
    feeding said first effluent as a second influent to a second serial continuously operated granular media filter;
    treating said second influent in said second granular media filter to produce a second effluent and a second reject; and
    subjecting said first and second rejects to a treatment to produce from said first and second rejects a treated liquid and a concentrate containing impurities from which said impurities can be eliminated in a separate treatment step.

2. The method for treating liquid as set forth in claim 1 wherein each of said first and second granular media filters are continuous upflow granular media filters.

3. The method for treating liquid as set forth in claim 1 wherein sand is used as a filter medium in each of said first and second granular media filters.

4. The method for treating liquid as set forth in claim 1 wherein a filter medium in said first granular media filter has a lower density than a filter medium in the second granular media filter.

5. The method for treating liquid as set forth in claim 1 wherein sand is used as a filter medium in said first granular media filter and garnet is used as a filter medium in the second granular media filter.

6. The method for treating liquid as set forth in claim 1 wherein a particulate filter medium is used in each of said first and second granular media filters with the particulate filter medium in said first granular media filter having a larger particle size than the particulate filter medium in said second granular media filter.

7. The method for treating liquid as set forth in claim 1 including disinfecting the liquid being treated before the liquid enters said first granular media filter, disinfecting the liquid before the liquid enters said second granular media filter, disinfecting the reject before the reject is treated, disinfecting the liquid as the liquid is being discharged from said second granular media filter and/or disinfecting said treated liquid and/or said concentrate after being treated.

8. The method for treating liquid as set forth in claim 7 wherein the disinfecting is accomplished with chlorine or a chlorine compound, with ozone or an oxygen compound and/or with UV light.

9. The method for treating liquid as set forth in claim 1 including adding coagulation and/or flocculation chemicals to said first influent prior to said first influent being fed into said first granular media filter and/or adding coagulation and/or flocculation chemicals to said second influent prior to said second influent being fed into said second granular media filter.

10. The method for treating liquid as set forth in claim 1 including adding coagulation and/or flocculation chemicals to said first reject prior to said first reject being fed for treatment and/or adding coagulation and/or flocculation chemicals to said second reject prior to said second reject being fed for treatment.

11. The method for treating liquid as set forth in claim 1 wherein said first and second rejects are treated by gravity separation, filtration, two stage or multistage filtration and/or membrane filtration.

12. The method for treating liquid as set forth in claim 11 wherein a discharge from gravity separation is subjected to membrane filtration, two stage or multistage filtration or filtration.

13. The method for treating liquid as set forth in claim 11 wherein a discharge from filtration is subjected to membrane filtration.

14. The method for treating liquid as set forth in claim 1 wherein the treated liquid is fed to said first influent prior to said first influent entering said first granular media filter.

15. The method for treating liquid as set forth in claim 14 wherein coagulation and/or flocculation chemicals are added to said first influent prior to said first influent being fed to said first granular media filter and said treated liquid is fed to said first influent prior to the addition of said coagulation and/or flocculation chemicals.

16. The method for treating liquid as set forth in claim 1 wherein sludge produced from said treatment is further treated so that said sludge is thickened and/or dewatered.

17. The method for treating liquid as set forth in claim 16 wherein sludge reject discharged from said sludge being further treated is combined with said first and second rejects prior to said first and second rejects being further treated.

18. The method for treating liquid as set forth in claim 16 wherein sludge reject discharged from said sludge being further treated is fed to said first influent prior to said first influent entering said first granular media filter.

19. The method for treating liquid as set forth in claim 18 wherein coagulation and/or flocculation chemicals are added to said first influent prior to said first influent being fed to said first granular media filter and said sludge reject is fed to the first influent prior to the addition of said coagulation and/or flocculation chemicals.

20. The method for treating liquid as set forth in claim 1 wherein said concentrate is subjected to a treatment destroying pathogens in said concentrate.

21. A method for treating a liquid having impurities therein, comprising:

feeding said liquid as a first influent to a first serial continuously operated granular media filter;

treating said first influent in said first granular media filter to produce a first effluent and a first reject;

feeding said first effluent as a second influent to a second serial continuously operated granular media filter;

treating said second influent in said second granular media filter to produce a second effluent and a second reject; and subjecting at least said first or said second rejects to a treatment to produce therefrom a treated liquid and a concentrate containing impurities from which said impurities can be eliminated in a separate treatment step.

22. The method for treating liquid as set forth in claim 21 wherein the treated liquid is fed to said first influent prior to said first influent entering said first granular media filter.

23. The method for treating liquid as set forth in claim 22 wherein coagulation and/or flocculation chemicals are added to said first influent prior to said first influent being fed to said first granular media filter and said treated liquid is fed to said first influent prior to the addition of said coagulation and/or flocculation chemicals.

* * * * *